United States Patent
Kikuchi

Patent Number: 5,323,093
Date of Patent: Jun. 21, 1994

[54] BRUSHLESS MOTOR DRIVING DEVICE

[75] Inventor: Atsushi Kikuchi, Chiba, Japan

[73] Assignee: Sony Corporation, Japan

[21] Appl. No.: 957,439

[22] Filed: Oct. 7, 1992

[30] Foreign Application Priority Data

Oct. 23, 1991 [JP] Japan ................. 3-305486

[51] Int. Cl.$^5$ ........................... H02K 23/00
[52] U.S. Cl. ................... 318/254; 318/439; 318/138
[58] Field of Search .......... 318/254, 439, 138

[56] References Cited
U.S. PATENT DOCUMENTS 4,654,506  3/1987  Sakamoto et al. ............ 219/121
5,182,499  1/1993  Inaji et al. ................... 318/254
5,182,500  1/1993  Shimada ...................... 318/254
5,194,794  3/1993  Shamoto ...................... 318/254

Primary Examiner—William M. Shoop, Jr.
Assistant Examiner—Karen Masih
Attorney, Agent, or Firm—Ronald P. Kananen

[57] ABSTRACT

A method for calculating a driving current waveform for minimizing a torque pulsation in brushless motors having a difference in construction of a magnetic circuit which are driven on such driving current. The method calculates the driving current waveform so as to reduce the sum of currents carried to coils of each phase of the brushless motor to zero, whereby a necessity to keep a common junction of the coils of each phase at a low impedance can be avoided and the circuit configuration simplified.

7 Claims, 13 Drawing Sheets

BRUSHLESS MOTOR DRIVING DEVICE

BACKGROUND OF THE INVENTION

1. Field of the Invention

This invention relates to brushless motor driving device, and more particularly to an improvement of the brushless motor driving device in which generates previously a waveform of a driving current.

2. Description of the Prior Art

With reference to this type of brushless motor driving device, considered workable hitherto is such device as is constructed to carry a driving current of sine waveform which is stored beforehand in a predetermined memory at a given timing to a coil of each phase constructing a brushless motor.

Meanwhile, the torque of a motor is generally calculated as a result obtained from multiplying a coil current by an interlinked flux. The interlinked flux of a coil however does not form an accurate sine wave practically, but forms a wave having an odd degree harmonic component. Accordingly, a problem to arise therefrom is such that if a current carried to the coil is sine wave, a torque waveform of the motor obtained through the current in sine wave and the interlinked flux in a waveform different therefrom will not be unified to cause a pulsation.

To solve the aforementioned problem, a conceivable method is such that a driving current waveform is generated at the time of manufacturing process adaptationally to an interlinked flux of individual motors without using a sine wave, and is stored in a memory, however, trial and error will be necessary for setting an optimal current waveform at every type of motors, thus complicating the work.

SUMMARY OF THE INVENTION

In view of the foregoing, an object of this invention is to provide a brushless motor driving device which is, capable of generating more easily a driving current waveform to unify a torque of a motor.

To solve such problems, in brushless motor driving devices 1, 10 comprising memory means 5 for storing driving current waveforms IU, IV, IW carried to coils LU, LV, LW of each phase of a brushless motor 2, specifying means 13 for specifying a rotor angle of the brushless motor 2 by counting predetermined frequency signals detected from the brushless motor 2, output means 9, 13 for outputting the driving current waveforms IU, IV, IW corresponding to the rotor angle from the memory means 5 according to the rotor angle specified by the specifying means 13, a first aspect of the invention comprises calculating the driving current waveforms IU, IV, IW carried to the coils LU, LV, LW of each phase so as to have a value obtained from multiplying an interlinked flux quantity the coils LU, LV, LW receive by a current value flowing to the coils LU, LV, LW at the value proportional to the square of a sine wave to the rotor angle, storing the calculation result in the memory means 5, driving the brushless motor 2 on the stored driving current waveforms IU, IV, IW.

Then, in the brushless motor driving device 10 comprising the memory means 5 for storing beforehand the driving current waveforms IU, IV, IW carried to the coils LU, LV, LW of each phase of the brushless motor 2, the specifying means 13 for specifying a rotor angle of the brushless motor 2 by counting predetermined frequency signals detected from the brushless motor 2, the output means 13 for outputting the driving current waveforms IU, IV, IW corresponding to the rotor angle from the memory means 5 according to the rotor angle specified by the specifying means 13, a second aspect of the invention comprises calculating such current waveforms as will reduce the sum of currents carried to the coils LU, LV, LW of each phase to zero and make an output torque of the brushless motor constant as the driving current waveforms IU, IV, IW.

The arrangement is such that the driving current waveforms IU, IV, IW wherein a torque pulsation gets small in brushless motors having a difference in construction of the magnetic circuit are calculated according to a predetermined method, and then the brushless motors are driven on the driving current waveforms IU, IV, IW, therefore the torque pulsation of the brushless motors can be minimized according to a simple method.

The driving current waveforms IU, IV, IW are calculated so as to reduce the sum of currents carried to the coils LU, LV, LW of each phase to zero, therefore a common junction of the coils LU, LV, LW of each phase need not particularly be suppressed to a low impedance, thereby simplifying the circuit configuration furthermore.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings:

First Embodiment

Figure 1:
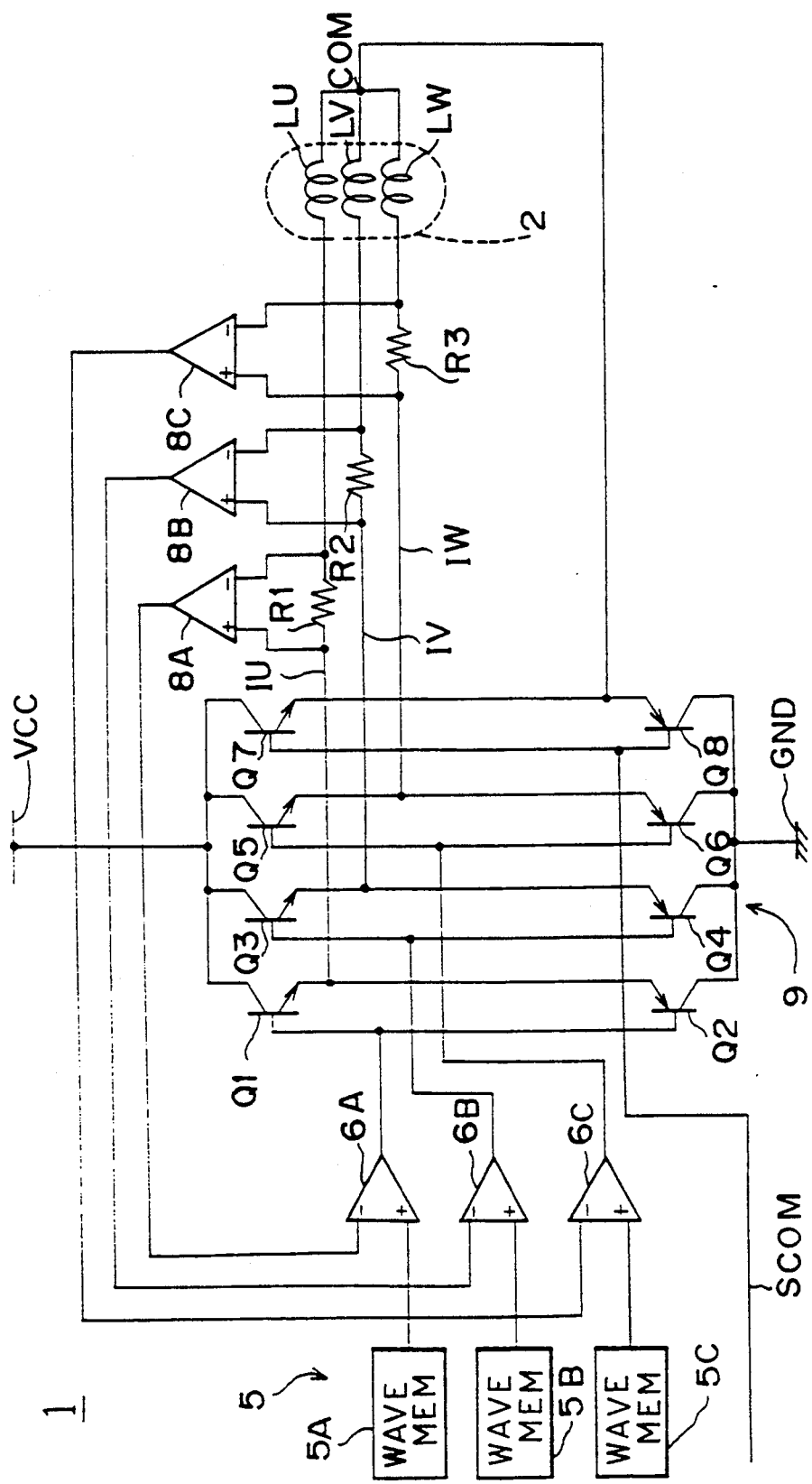
FIG. 1 is a connection diagram representing a first embodiment of a brushless motor driving device according to the present invention.

In FIG. 1 reference numeral 1 indicates a brushless motor driving device for driving a 3-phase brushless motor 2 as a whole and current waveforms to be carried at each of the coils LU, LV, LW of each phase of the brushless motor 2 are stored in corresponding waveform memories 5A, 5B and 5C, respectively, as voltage values.

The waveform memory 5A corresponding to the first coil LU inputs a driving current waveform stored therein to a non-inverse input end of a comparator 6A.

The comparator 6A inputs a current value of the coil LU outputted from a comparator 8A to an inversional input, compares a current waveform value from the waveform memory 5A, with a detected current value from the comparator 8A, and sends the difference to a voltage/current conversion circuit 9 as a driving output.

The voltage/current conversion circuit 9 converts the driving output into a current which is inputted at a current conversion portion for U-phase consisting of two transistors Q1 and Q2 with bases connected with each other, and sends the converted current to the coil LU by way of a resistance R1.

Then, the waveform memory 5B corresponding to the coil LV inputs the driving current waveform stored therein to a non-inverse input of a comparator 6B. The comparator 6B inputs a current value of the coil LV outputted from a comparator 8B to an inverse input, compares a current waveform from the waveform memory 5B with a detected current value from the comparator 8B, and sends the difference to the voltage/current conversion circuit 9 as a driving voltage.

The voltage-current conversion circuit 9 converts the driving voltage into a current which is inputted at a current conversion portion for V-phase consisting of two transistors Q3 and Q4 with bases connected with each other, and sends the converted current to the coil LV by way of a resistance R2.

Then, the waveform memory 5C corresponding to the coil LW inputs the driving current waveform stored therein to a non-inverse input of a comparator 6C. The comparator 6C inputs a current value outputted from a comparator 8C to an inverse input, compares a current waveform value from the waveform memory 5C with a detected current value from the comparator 8C, and sends the difference to the voltage-current conversion circuit 9 as a driving voltage.

The voltage-current conversion circuit 9 converts the driving voltage into a current which is inputted at a current conversion portion for W-phase consisting of two transistors Q5 and Q6 with bases connected with each other, and sends the converted current to the coil LW by way of a resistance R3.

Then, transistors Q7 and Q8 operate according to a predetermined driving signal SCOM, and correct a current of a common junction COM of the coils LU, LV and LW.

Thus currents based on the driving current waveforms stored beforehand in the waveform memories 5A, 5B and 5C are carried to the coils LU, LV and LW at a predetermined timing.

Here, the driving current waveforms stored beforehand in the waveform memories 5A, 5B and 5C are those of having been calculated according to counter-electromotive voltages (or interlinked fluxes of each coil) obtained from the coils LU, LV and LW of each phase by driving the brushless motor externally at the time of manufacturing process, which are so calculated as current waveforms whereby a resultant output torque TRQ of the brushless motor 1 is unified.

That is, based on a principle that an output torque of the brushless motor will be unified from setting that for which the interlined flux of each coil is multiplied by a carried current to be the square of a sine wave, that of dividing a waveform of the square of the sine wave by the interlinked flux (counter-electromotive voltage) is stored in the waveform memories 5A, 5B and 5C each as driving current waveform, thereby driving the brushless motor 2.

Figure 2:
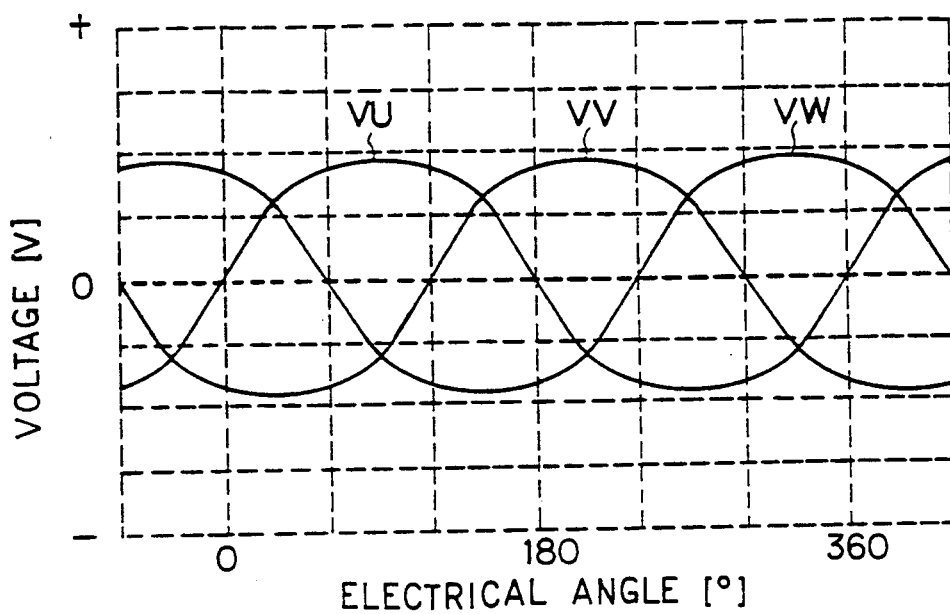
FIG. 2 is a characteristic curve showing counter-electromotive voltage waveforms.
Figure 3:
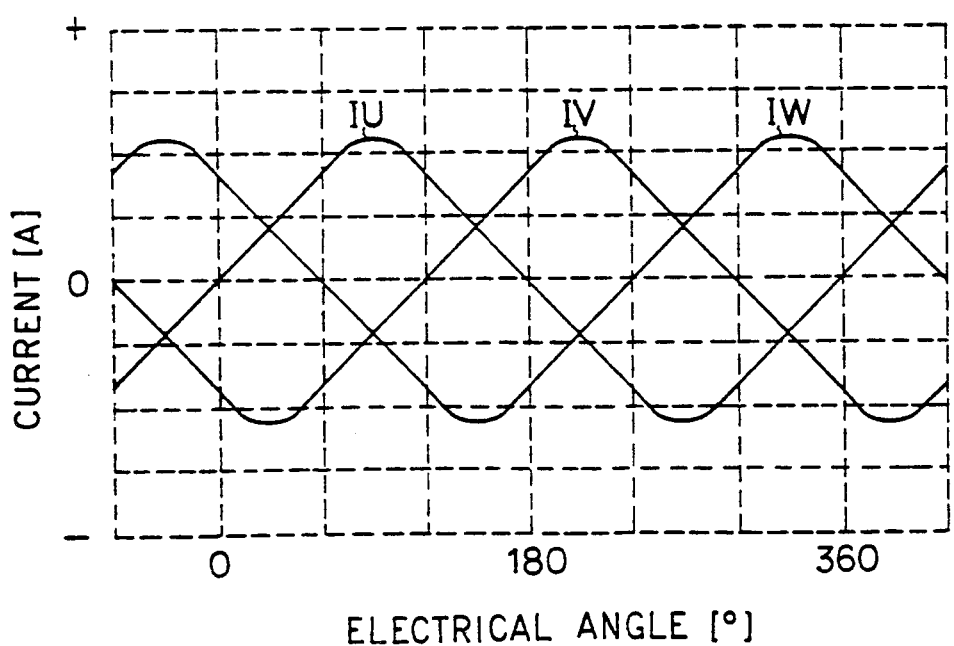
FIG. 3 is a characteristic curve showing calculated carried current waveforms.

A method for calculating driving current waveforms will now be exemplified. FIG. 2 indicates counter-electromotive voltage waveforms VU, VV and VW (or change in interlinked flux quantity to a rotor angle) including an odd degree harmonic component generated by the coils LU, LV and LW, and a result obtained from dividing the square value of a sine wave comprising the equiphase to a fundamental wave component of the counter-electromotive voltage waveforms VU, VV and VW by the counter-electromotive voltage indicates the waveforms IU, IV and IW shown in FIG. 3.

The waveforms IU, IV and IW indicate a large value at a position where a level of the interlinked flux waveforms of the coils LU, LV and LW is small as compared with the level of a reference sine wave in equiphase, but indicate a small value at a position where the level of the interlinked flux waveforms is larger than the level of the sine wave in equiphase.

Figure 4:
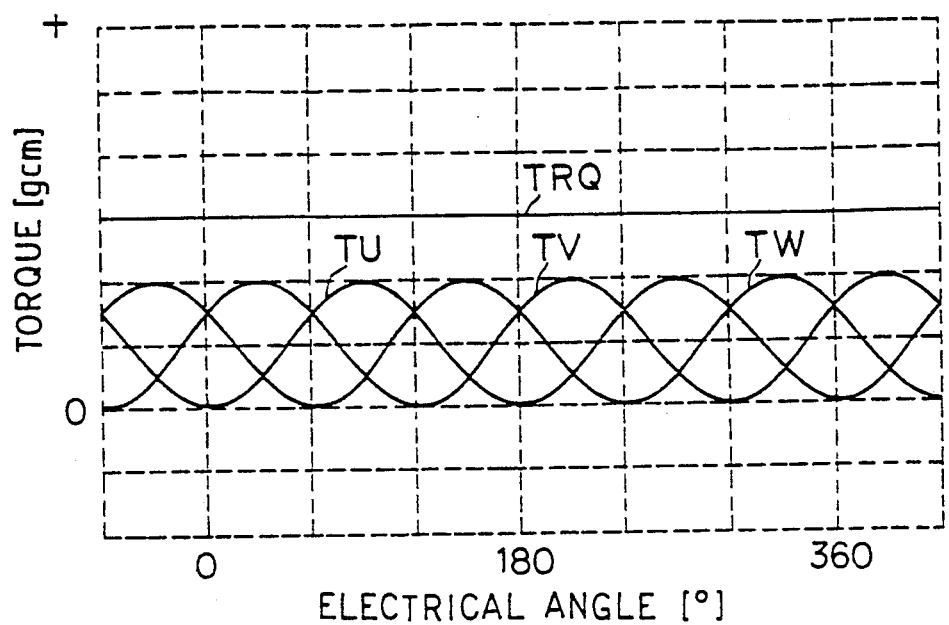
FIG. 4 is a characteristic curve showing torque waveforms when a brushless motor is driven according to calculated carried current waveforms.

Accordingly, the waveforms IU, IV and IW are stored in the waveform memories 5 (5A, 5B, 5C) as driving current waveforms to be carried to the coils LU, LV and LW, read out at a predetermined timing according to the rotor angle when the brushless motor 2 is driven, and from driving the brushless motor 2 by carrying a current to the coils LU, LV and LW, a generated torque of each phase indicates waveforms TU, TV and TW shown in FIG. 4. The torque waveforms TU, TV and TW being proportional to the square of the sine wave, the resultant torque TRQ obtained from combining these waves is unified.

Figure 5:
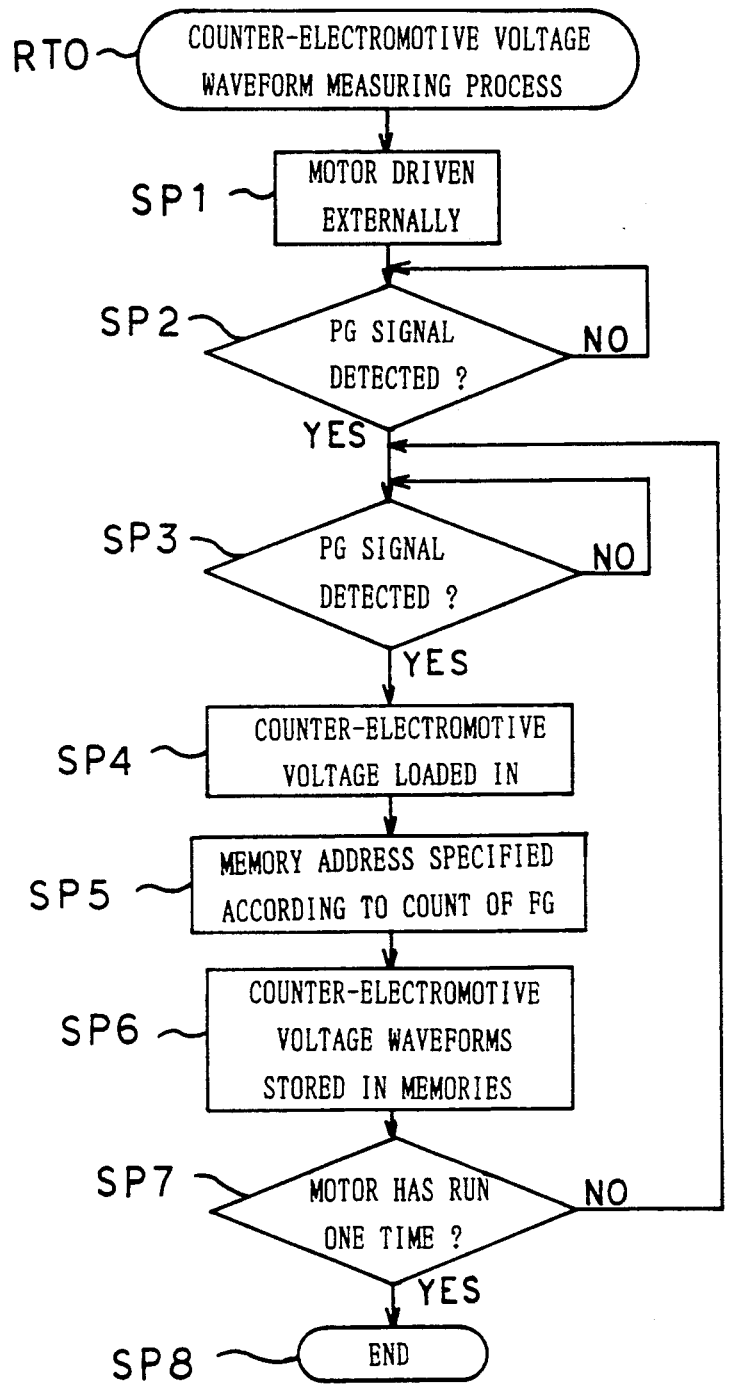
FIG. 5 is a flowchart indicating a procedure for counter-electromotive voltage measuring process.
Figure 6:
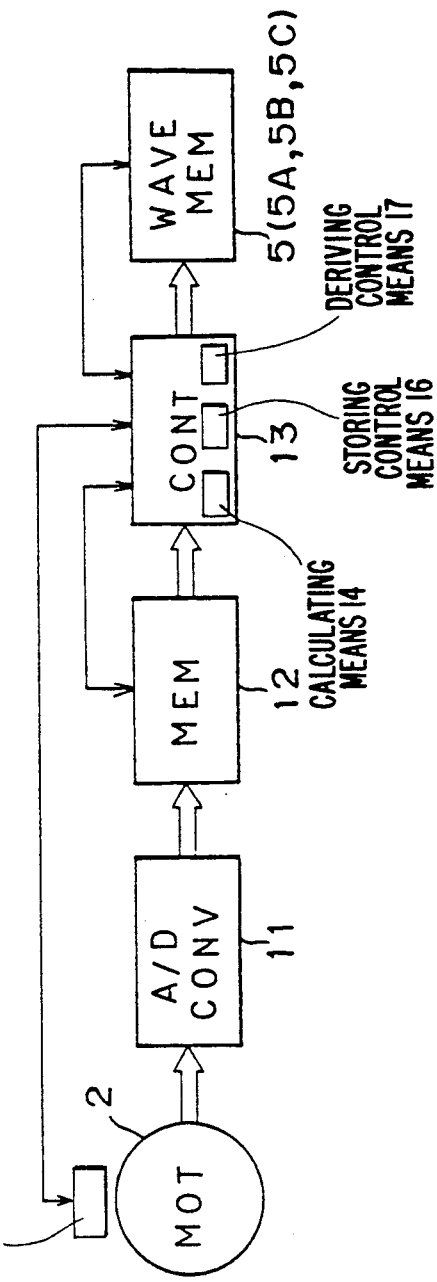
FIG. 6 is a block diagram showing a counter-electromotive voltage waveform measuring system.

In the aforementioned construction, FIG. 5 indicates a procedure for a motor counter-electromotive voltage waveform measuring process RTO at the time of manufacture, wherein measured is a counter-electromotive voltage generated on the coils LU, LV, LW (that is, an interlinked flux quantity of the coils LU, LV, LW) at the time of rotor driving by means of a counter-electromotive voltage measuring system 10 shown in FIG. 6.

More specifically, a control device 13 of the counter-electromotive voltage measuring system 10 carries out the counter-electromotive voltage waveform measuring process RTO shown in FIG. 5, and in step SP1 first, the brushless motor 2 is driven externally, then in step SP2 whether or not a PG signal (pulse generation signal) obtained from a pulse generator (not indicated) provided on the brushless motor 2 is detected is decided. If a negative result is obtained, then this means that a rotor portion has not yet been rotated as far as a reference position for the coil to be measured, and hence the control device 13 returns to step SP2 to repeat the process loop until the PG signal is detected.

If an affirmative result is obtained in step SP2, this means that the rotor portion has reached the reference position, and thus the control device 13 proceeds to the next step SP3 to decide whether or not an FG signal (frequency generation signal) is detected from the brushless motor 2.

The FG signal is obtainable through a specifying means 15 (FIG. 6) which may comprise a magnetic detection pattern provided along the direction in which the brushless motor 2 is rotated, and is capable of detecting a rotational position of the rotor portion for which the PG signal is standardized. Accordingly, if negative result is obtained in step SP3, this means that the rotor portion has not reached a measuring point indicated by the FG signal, and the control device 13 then returns to step SP3 to repeat the process loop until the FG signal is detected.

Here, if an affirmative result is obtained in step SP3, then this means that the rotor portion has reached a first measuring point for which a reference position by the PG signal is standardized, and the control device 13 proceeds to the ensuing step SP4 to measure a counter-electromotive voltage generated from each coil.

Further the control device 13 proceeds to step SP5 to specify addresses whereat to store counter-electromotive voltages of each coil in a memory 12, and then stores the counter-electromotive voltages of each coil at the addresses thus assigned in the ensuing step SP6.

The control device 13 further decides whether or not the motor has run one time in the next step SP7, and if a negative result is obtained, it returns to step SP3 to repeat the process loop as steps SP3-SP4-SP5-SP6-SP7-SP3.

Thus, counter-electromotive voltage of each coil are stored successively in the memory 12 at every measuring point whereat one revolution of the rotor is divided into a predetermined number, and when the rotor runs one time, an affirmative result is obtained in step SP7, and then the control device 13 terminates the counter-electromotive voltage waveform measuring process RTO in the ensuing step SP8. Thus the counter-electromotive voltage waveforms at every coils are stored in the memory 12.

Figure 7:
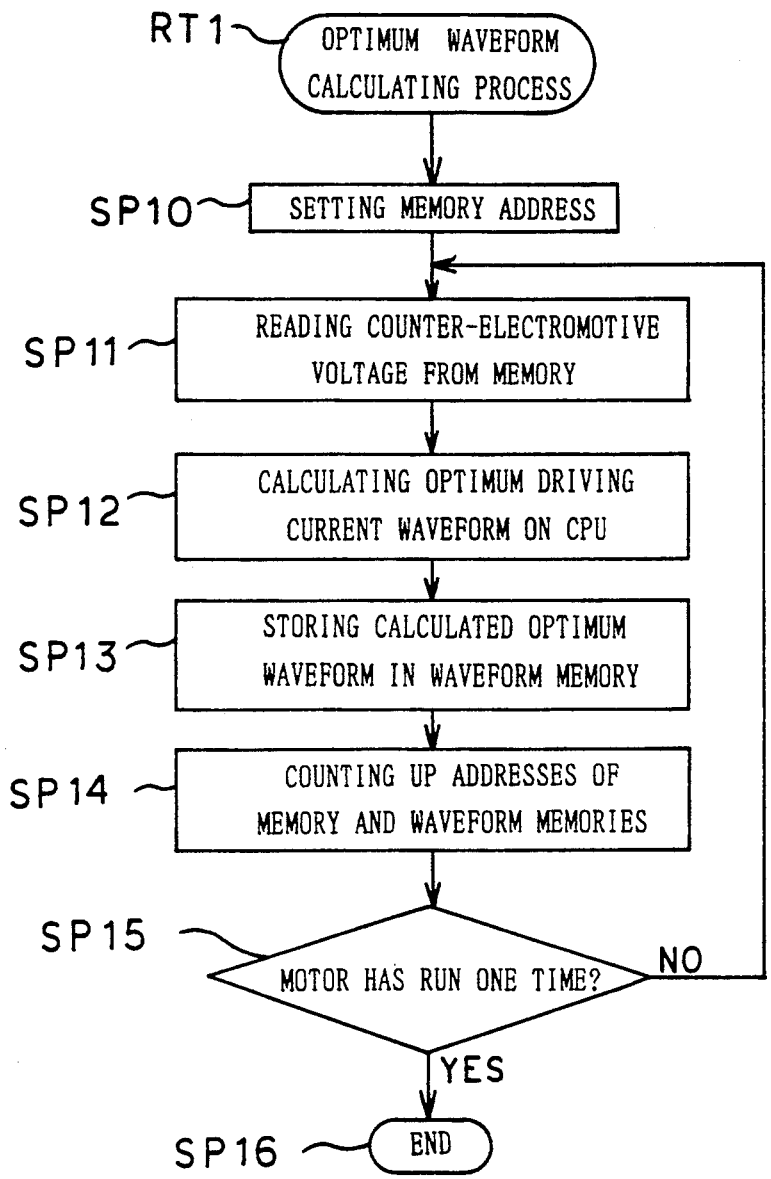
FIG. 7 is a flowchart indicating a procedure for optimum waveform calculating process.

In such state the control device 13 comes into an optimum waveform calculating process RT1 of the driving current shown in FIG. 7, sets addresses of the waveform memories 5 or the memories 5A, 5B, 5C provided at every phase in step SP10, then proceeds to step SP11 to read the counter-electromotive voltage VU, VV and VW from the memory 12, and further proceeds to step SP12 to calculate value of the optimum driving current waveforms IU, IV, IW from the counter-electromotive voltage VU, VV and VW on a CPU 14 (calculating means) of the controlling device 13.

The calculated values thus obtained are loaded via a storing control means 16 of the control device in the waveform memories 5 (5A, 5B and 5C) in the ensuing step SP13, addresses of the memory 12 and the waveform memories 5 (5A, 5B and 5C) are then counted up in the ensuing step SP14, and whether or not the rotor of the brushless motor 2 has run one time is decided according to the aforementioned PG signal and FG signal in the ensuing step SP15.

If a negative result is obtained in step SP15, then this means that the rotor has not run one time, and in this case the control device 13 returns to the aforementioned step SP11 to repeat the process loop as steps SP11-SP12-SP13-SP14-SP11.

Thus, while the rotor of the brushless motor 2 runs one time, the control device 13 calculates values of the optimum current waveforms IU, IV and IW according to the counter-electromotive voltages VU, VV and VW, stores the result at each address of the waveform memories 5 (5A, 5B and 5C), and thus the optimum current waveforms IU, IV and IW to be carried which correspond to one revolution of the brushless motor 2 are stored in the waveform memories 5 (5A, 5B and 5C).

Thus, when the rotor has run one time and the optimum current waveforms IU, IV and IW for the one revolution are all stored, the control device 13 terminates the optimum current waveform calculating process RT1 in the ensuing step SP16.

Figure 8:
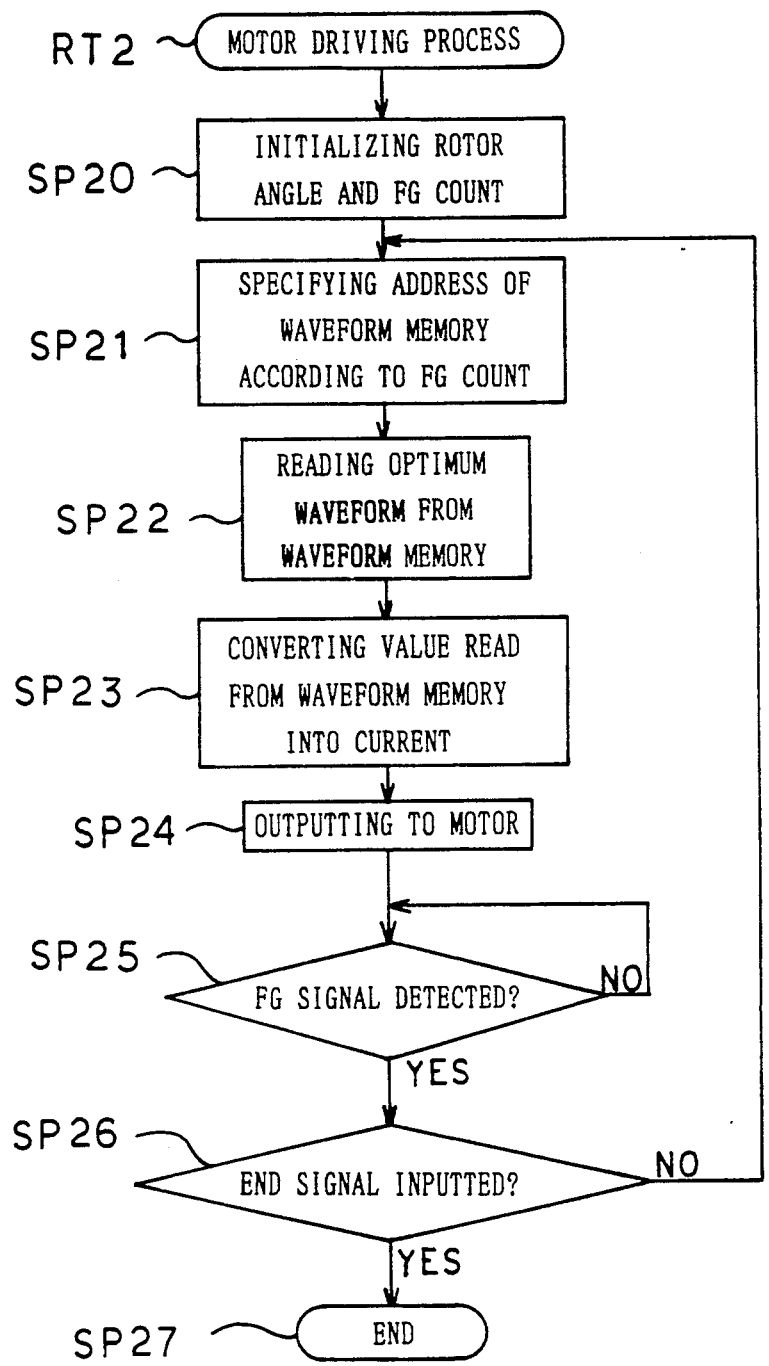
FIG. 8 is a flowchart indicating a motor driving process.

The brushless motor 2 is driven for operation by means of the optimum current waveforms IU, IV and IW stored in the waveform memories 5 in the manufacturing process as described above. The driving operation is given in a procedure for motor driving process RT2 of FIG. 8, and is carried out by means of a motor driving device of FIG. 9 in which like reference characters represent like portions in FIG. 1 and FIG. 6.

That is, the control device 13 initializes a rotor angle of the brushless motor 2 and a count value of the FG signal in step SP20 of a motor driving process RT2.

Thus a rotational position of the rotor is specified via specifying means 15, and addresses of the waveform memories 5 are specified in accordance with the count value of the FG signal in the ensuing step SP21.

Accordingly, after the addresses of the waveform memories 5 (5A, 5B and 5C) in which current values to be carried to the coils LU, LV and LW of each phase are stored are specified in accordance with a state of rotation (rotational position of the rotor) of the brushless motor 2, these are read in step SP22.

From carrying out a process of step SP23, a deriving control means 17 of the control device 13 continuously inputs values read from the waveform memories 5 (5A, 5B and 5C) to the V/I (voltage to current) conversion circuit 9 through a digital/analog (digital to analog) converter 7 (FIG. 9), converts values of the optimum current waveforms IU, IV and IW stored in the waveform memories 5 as voltage values into current values, and then outputs them to the corresponding coils LU, LV and LW of each phase of the brushless motor 2 in the ensuing step SP24. Accordingly, the brushless motor 2 is driven by a current according to the optimum current waveforms IU, IV and IW stored in the waveform memories 5 (5A, 5B and 5C).

In the state of drive the control device 13 proceeds to the ensuing step SP25 to decide whether or not the FG signal has been detected from the brushless motor 2.

If a negative result is obtained, then this means that the rotor of the brushless motor 2 has not yet been rotated as far as the position whereat the FG signal is generated, and thus the control device 13 repeats a process of the step SP25 until an affirmative result is obtained.

If the affirmative result is obtained, then this means that the rotor of the brushless motor 2 has been rotated as far as the position ready for generating the FG signal, and the control device 13 proceeds to the ensuing step SP26 to decide whether or not a signal for terminating the motor driving is inputted externally.

If a negative result is obtained, this means that a motor driven state must be kept on, and thus the control device 13 returns to the aforementioned step SP21 to update addresses of the waveform memories 5 according to the FG signal counted up, and carries out the process of steps waveform SP21-SP22-SP23-SP24-SP25-SP26.

Thus from repeating the process loop of steps SP21 to SP26 until an affirmative result is obtained in step SP26, the brushless motor 2 is driven by the optimum current waveform value read from addresses of the corresponding waveform memories 5 at every section divided by the relational position for generating the FG signal.

Further, if an affirmative result is obtained in the step SP26, then this means that an instruction for terminating the motor driving has been inputted externally, and hence the control device 13 proceeds to the ensuing step SP27 to terminate the motor driving process RT2.

Thus, the brushless motor 2 is driven by the optimum current waveforms IU, IV and IW calculated beforehand at the time of manufacturing process, and hence the torques TU, TV and TW generated by the coils LU, LV and LW of each phase can be adjusted to a waveform proportional to the square of a sine wave, thereby unifying the resultant torque TRQ having combined the torques TU, TV and TW.

According to the above-described construction, an arrangement is such that driving current waveforms are generated beforehand according to a simple method based on an interlinked flux of coils of each phase, and the brushless motor 2 is driven by the driving currents, therefore a pulsation of the resultant torque TRQ having combined the torques TU, TV and TW generated by the coils of each phase can be prevented more easily.

Then, in the aforementioned embodiment, the description has referred to the case where the torque waveforms TU, TV and TW generated on the coils LU, LV and LW of each phase are shifted accurately by 120[°] in the 3-phase brushless motor 2, however, the present invention is not necessarily limited thereto, and hence is applicable to a case where each phase is shifted further to 120[°].

Figure 10:
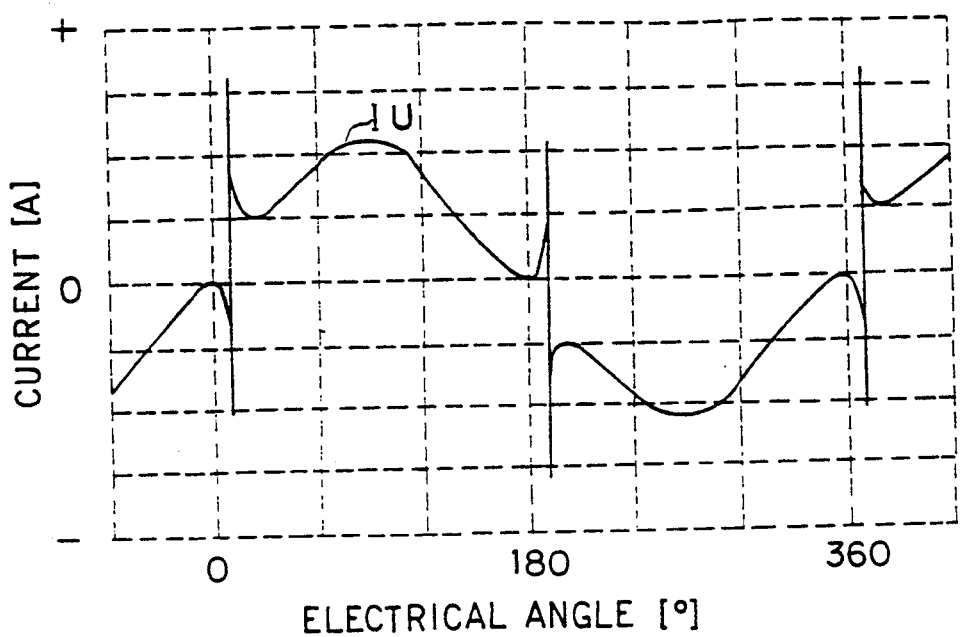
FIG. 10 is a characteristic curve showing a carried current waveform flowing when a phase shift occurs.

In this case, when phased to the fundamental wave of a counter-electromotive voltage of one phase, there may occur a phase shift from other phase to flat the resultant torque TRQ around 0 [V] of counter-electromotive voltage in result, therefore a sharp change of a driving current as shown in FIG. 10 will be necessary. However, such change in current is not only to cause a motor noise but also to realize nothing ready for current carrying practically.

Figure 11:
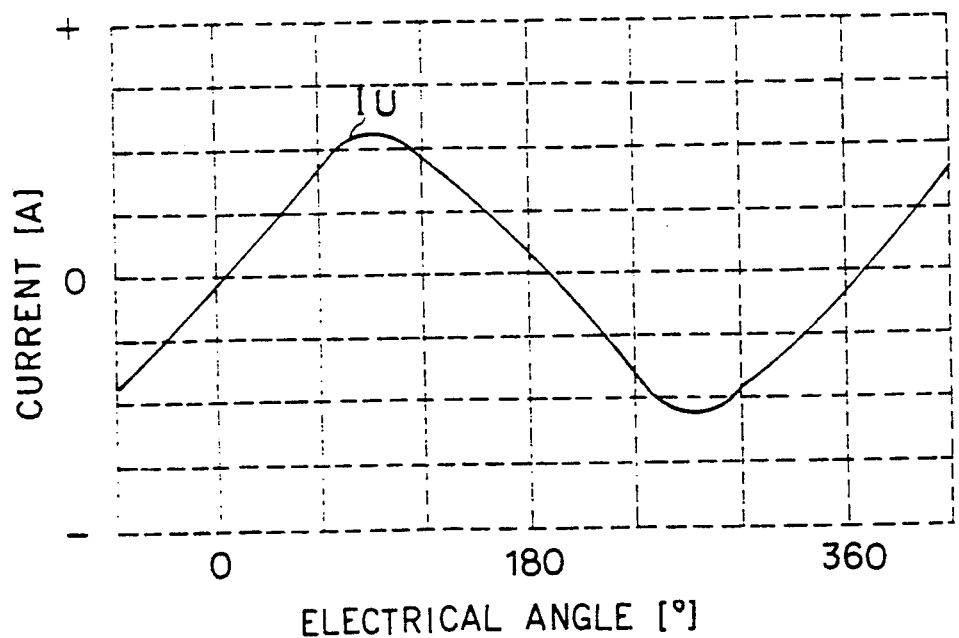
FIG. 11 is a characteristic curve showing a carried current waveform corrected when a phase shift occurs.

Employed, accordingly, is such a method as will prevent a sharp change in current from arising around 0 [V] of the counter-electromotive voltage. That is, as shown in FIG. 11, when an amplitude of the counter-electromotive voltage comes not more than 30% of the fundamental wave amplitude, calculated current values at points 30% on a plus side and a minus side of the counter-electromotive voltage are connected by a straight line without employing data calculated by the control device 13.

Figure 12:
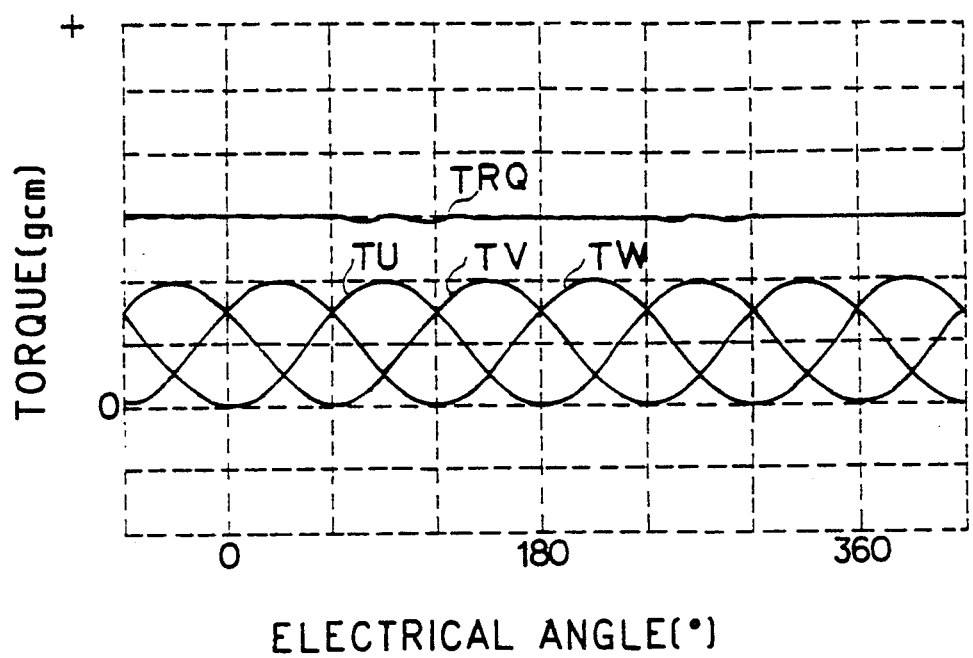
FIG. 12 is a characteristic curve showing torque waveforms when a motor is driven on a corrected current waveform.

Thus, a current changing smoothly can be carried around 0 [V] of the counter-electromotive voltage. The torques TU, TV and TW by the coils LU, LV and LW of each phase and the resultant torque TRQ in this case are as shown in FIG. 12, and thus a sharp change in current can be avoided as adjusting a pulsation of the resultant torque TRQ to 1 [%] or so within a practically sufficient range.

In the aforementioned embodiment, the description has referred to the case where calculated current values at points 30% on a plus side and a minus side of the counter-electromotive voltage are connected by a straight line, however, the present invention is not necessarily limited thereto, and hence points when coming to other percentage to the fundamental wave amplitude may be connected otherwise.

Second Embodiment

Figure 13:
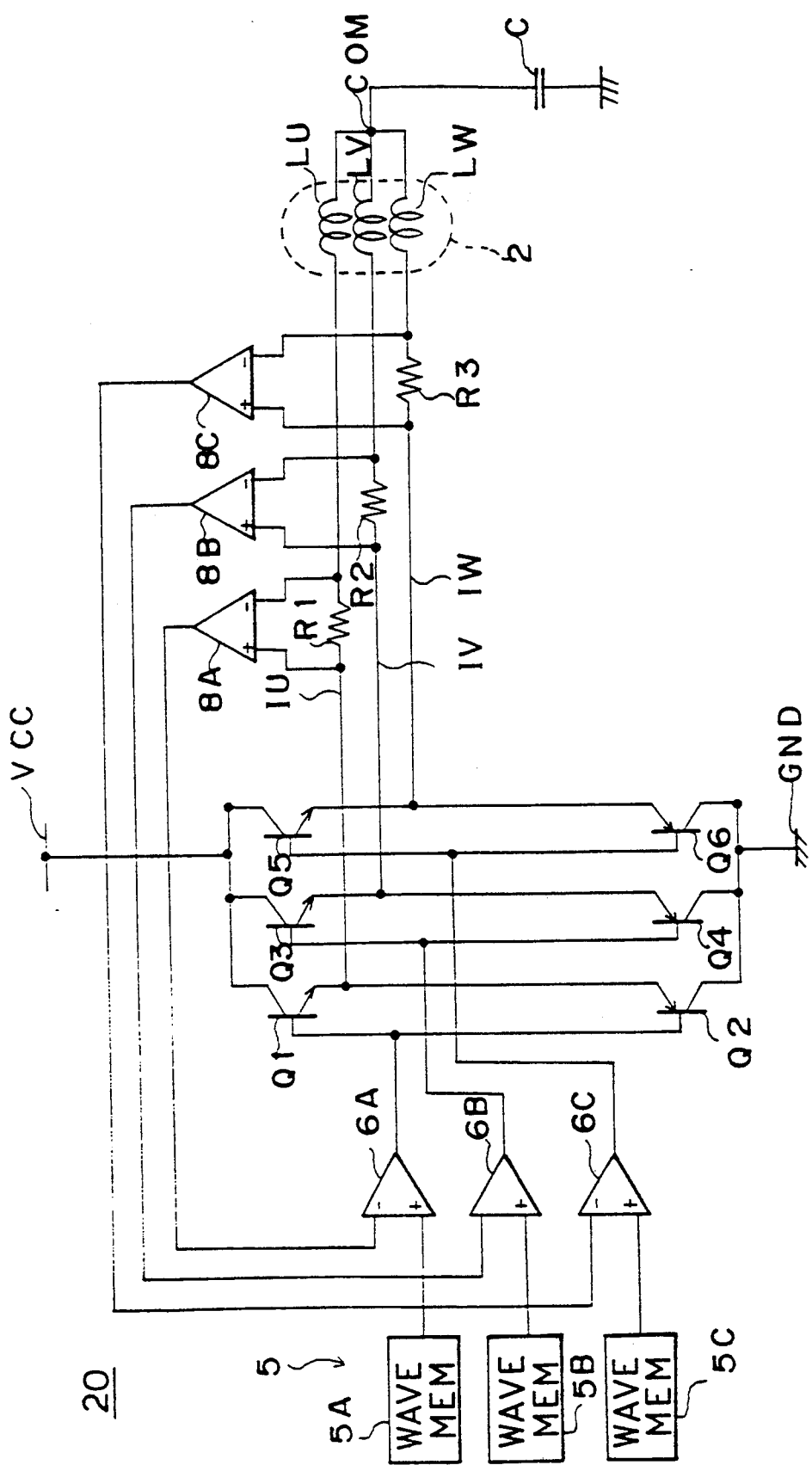
FIG. 13 is a connection diagram representing a second embodiment of a brushless motor driving device according to the present invention.

FIG. 13 wherein like reference characters represent like portions in FIG. 1 indicates a second embodiment of the brushless motor driving device according to the present invention, and a reference numeral 20 denotes a brushless motor driving device for driving the 3-phase brushless motor 2 as a whole.

Optimum current waveforms to be carried to the coils LU, LV and LW of each phase are stored in the waveform memories 5A, 5B and 5C, and from carrying the current waveforms at a predetermined timing according to a rotor angle, the brushless motor 2 will be driven.

Here, in the above-described first embodiment, the construction is such that a driving circuit (comprising transistors Q7 and Q8) for controlling a current to the common junction COM of the coils LU, LV and LW of each phase is provided, and the transistors Q7 and Q8 are controlled accordingly even in case the sum of currents flowing to the coils LU, LV and LW of each phase is not zero, thereby controlling a necessary current.

In the present embodiment, however, from reducing the sum of current values carried to the coils LU, LV and LW to zero with references to current waveforms stored beforehand in the waveform memories 5A, 5B and 5C, a necessity to control a current to the common junction COM is avoided, and thus the transistors Q7 and Q8 will not particularly be provided. Accordingly, an oscillation preventing capacitor C for decreasing a high frequency impedance is connected to the common junction COM.

Figure 14:
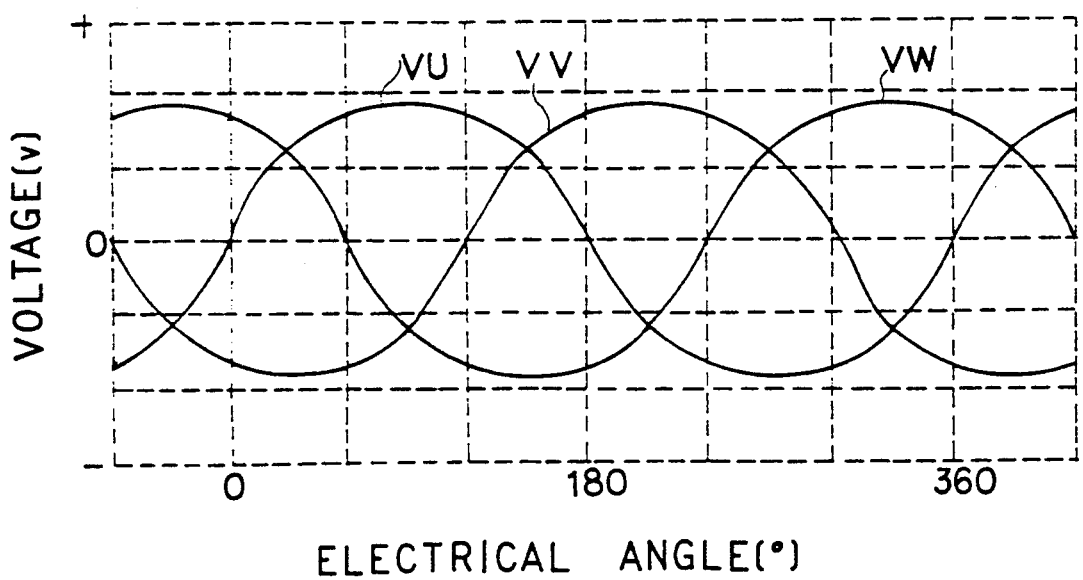
FIG. 14 is a characteristic curve showing counter-electromotive voltage waveforms.
Figure 15:
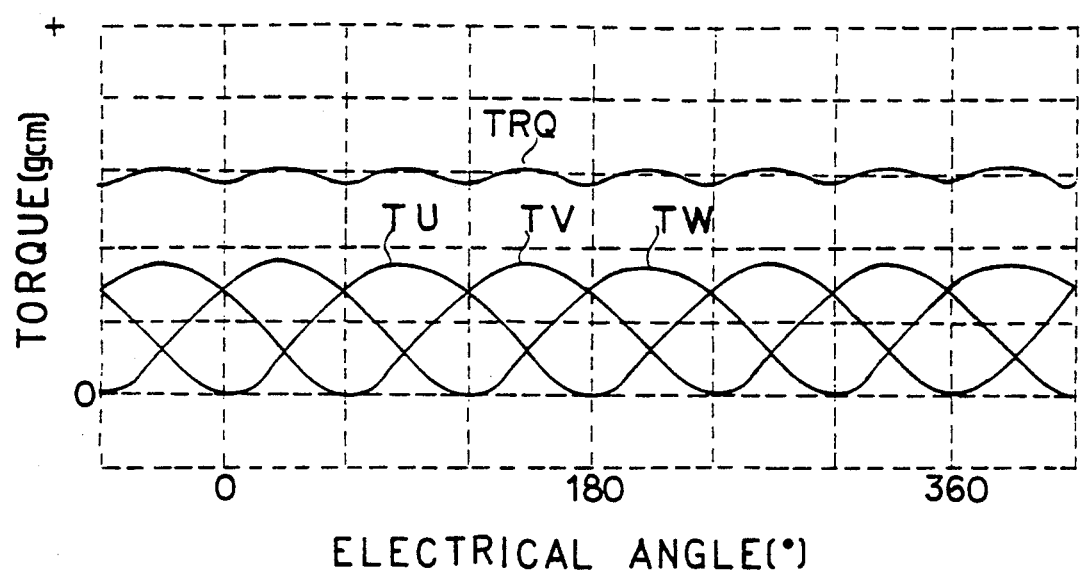
FIG. 15 is a characteristic curve showing torque waveforms of a motor driven by a current calculated according to the counter-electromotive voltage including an odd degree harmonic component.

That is, for calculation of the current waveforms stored in the waveform memories 5A, 5B and 5C, when the counter-electromotive voltages VU, VV and VW generated by the coils LU, LV and LW of each phase include an odd degree harmonic component as shown in FIG. 14, the torques TU, TV and TW of each phase and the resultant torque TRQ shown in FIG. 15 are generated from carrying sine wave currents with 120[°] phase difference to each phase.

The resultant torque TRQ is not unified due to an odd degree harmonic component included in the waveforms of the counter-electromotive voltages VU, VV and VW generated by the coils of each phase. Accordingly, the driving current waveforms IU, IV and IW obtained through multiplying an inverse number of the resultant torque TRQ by the sine wave currents carried to each phase are shown in FIG. 16.

Figure 17:
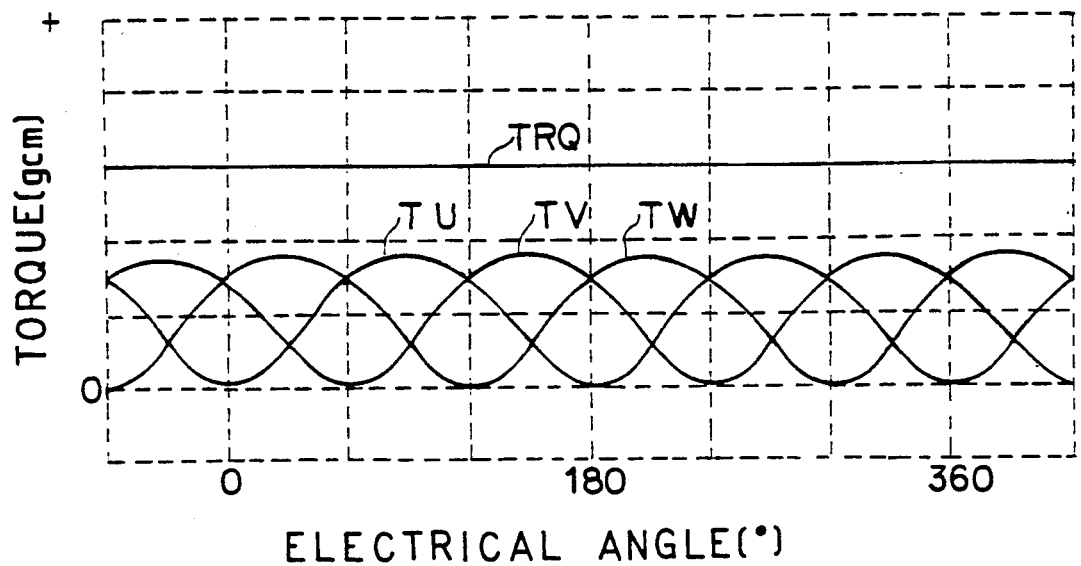
FIG. 17 is a characteristic curve showing torque waveforms when a motor is driven by the calculated current waveform.

A component to negate the pulsation of the resultant torque TRQ (FIG. 15) is included in the driving current waveforms IU, IV and IW, therefore if such currents are carried to the coils LU, LV and LW of each phase, a pulsation component of the resultant torque TRQ (FIG. 15) of the brushless motor 2 is negated to be a constant resultant torque waveform TRQ as shown in FIG. 17.

Figure 16:
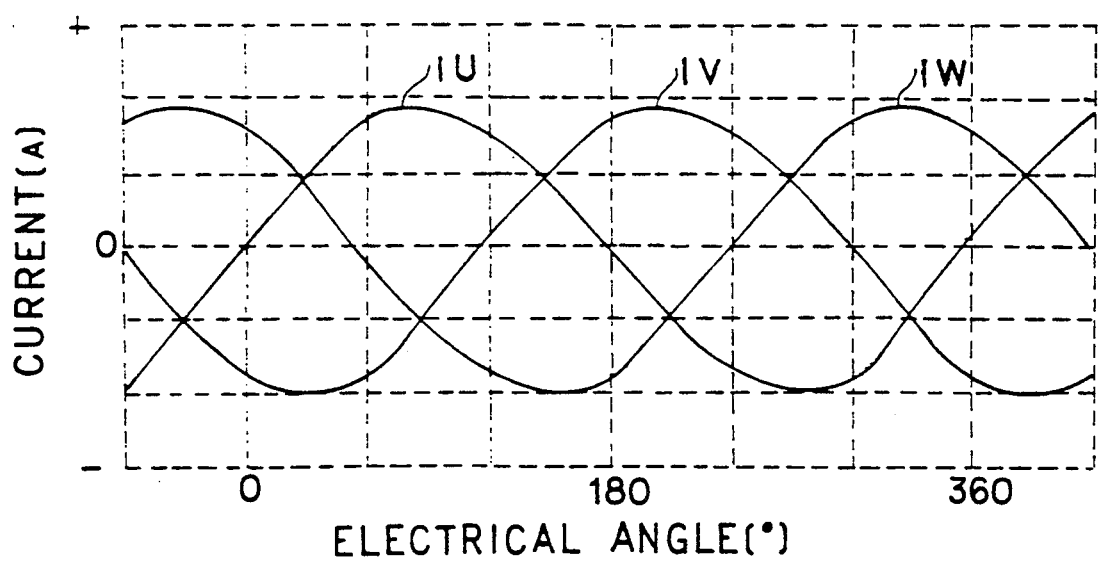
FIG. 16 is a characteristic curve showing current waveforms calculated so as to prevent a torque pulsation of a motor.

Here, when 3-phase sine wave currents with 120[°] phase difference are carried to the coils, a controlled amount of the current at the common junction COM is reduced to zero, however, even in case of the current waveforms IU, IV and IW shown in FIG. 16, a three-phase relation with an arbitrary rotor angle remains same as in the case of sine wave, therefore a total current at the common junction COM becomes zero.

An example of calculation for reducing a total current at the common junction COM to zero will be shown here in the concrete. First, as each variable, function and constant, a rotor angle (electrical angle) is indicated by $\theta$, counter-electromotive voltages of each phase are indicated by $VU(\theta)$, $VV(\theta)$ and $VW(\theta)$ (a fundamental wave component of $VU(\theta)$ being $k_{sin}$ with k as a constant), a maximum value of the assumed counter-electromotive voltage is indicated by $V_{MAX}$, and thus a torque correcting function $K(\theta)$ is defined by the following formula:

$$k(\theta) = 1.5 V_{MAX} / \{ \sin\theta \cdot VU(\theta) + \sin[\theta + \tfrac{2}{3}\pi] \cdot VV(\theta) + \sin[\theta + 4/3\pi] \cdot VW(\theta) \} \quad (1)$$

From $K(\theta)$, output current waveforms $IU(\theta)$, $IV(\theta)$ and $IW(\theta)$ will be functions ("A" indicating an arbitrary gain) given by the following expressions:

$$IU(\theta) = A \cdot K(\theta) \sin\theta \quad (2)$$

$$IV(\theta) = A \cdot K(\theta) \sin[\theta + \tfrac{2}{3}\pi] \quad (3)$$

$$IW(\theta) = A \cdot K(\theta) \sin[\theta + 4/3\pi] \quad (4)$$

Accordingly, the total current I is calculated by the following expression:

$$I = IU(\theta) + IV(\theta) + IW(\theta) \quad (5)$$

$$= A \cdot K(\theta) \cdot \left\{ \sin\theta + \sin\left[\theta + \tfrac{2}{3}\pi\right] + \sin\left[\theta + \tfrac{4}{3}\pi\right] \right\}$$

$$= A \cdot K(\theta) \times 0 = 0$$

and thus it is understood that the total current I becomes 0.

Figure 9:
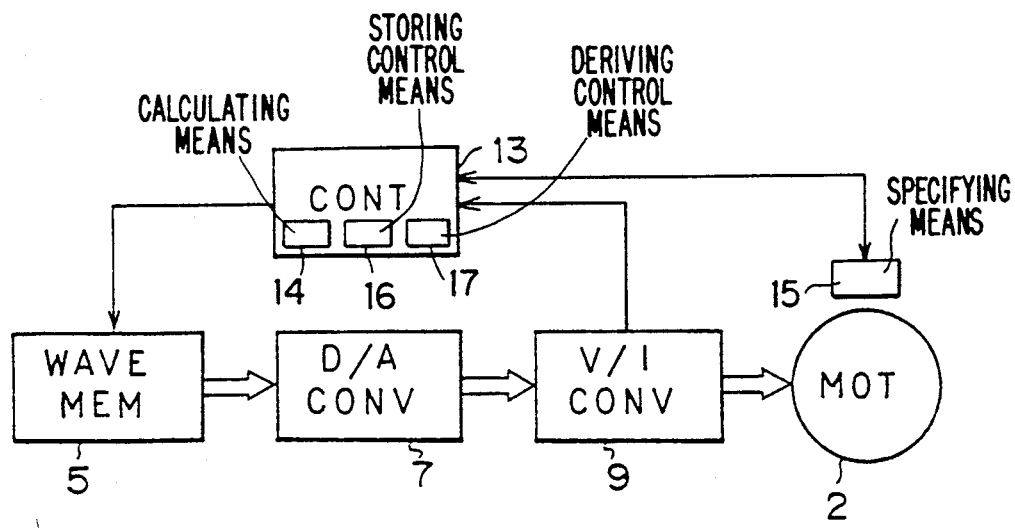
FIG. 9 is a block diagram showing a motor driving device.

According to the aforementioned calculating method, an operation for storing the current waveforms in the waveform memories 5 (5A, 5B and 5C) at the time of manufacturing process is carried out as in the case of FIG. 6, and from driving the brushless motor 2 by means of the waveforms stored in the waveform memories 5 (5A, 5B and 5C) as in the case of FIG. 9, the current value at the common junction COM of the coils LU, LV and LW of each phase can be reduced to zero, and the resultant torque TRQ can be unified as well.

According to the aforementioned construction, the current value at the common junction COM Of the coils of each phase can be zero, therefore a necessity to keep the common junction COM at a low impedance can be avoided, and thus the circuit configuration can be simplified inasmuch as the transistors Q7 and Q8 are not particularly provided.

Further, when the aforementioned current waveform calculating method is used, the current waveform does not indicate a sharp change, therefore a motor noise is prevented from getting large.

Additionally, in the embodiment mentioned above, the description refers to the case where the counter-electromotive voltages VU, VV and VW of each phase have a phase difference accurately at 120[°], however, the present invention is not necessarily limited thereto, and hence is applicable likewise to the case where each phase is shifted further to 120[°].

Figure 18:
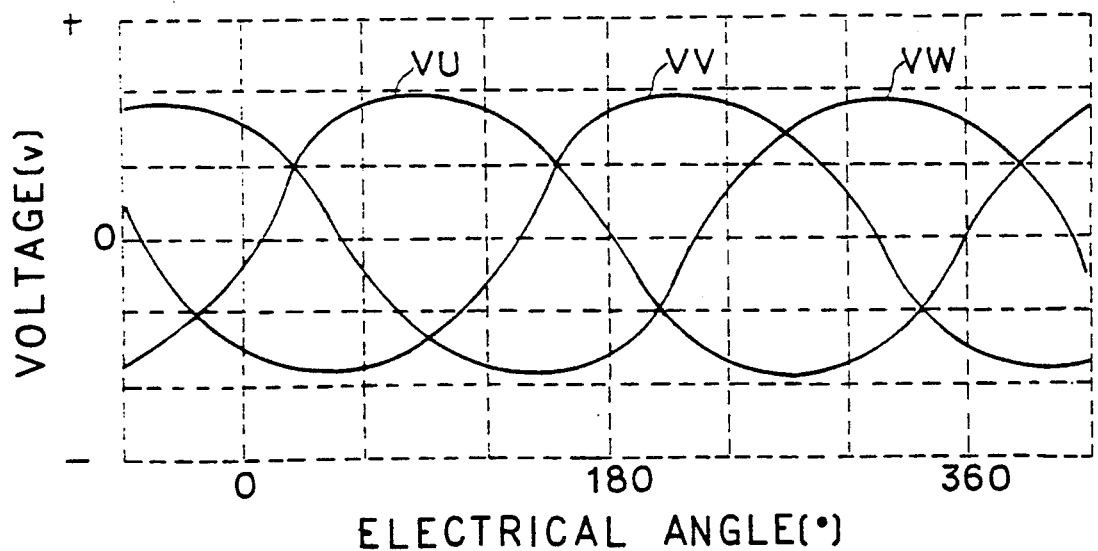
FIG. 18 is a characteristic curve showing counter-electromotive voltage waveforms having a phase shift.
Figure 19:
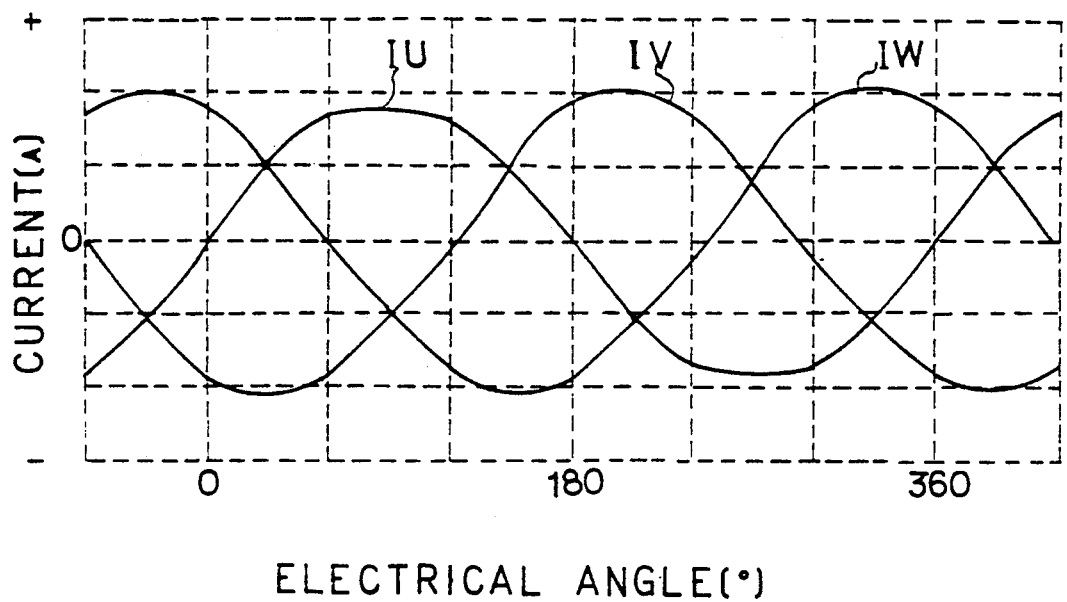
FIG. 19 is a characteristic curve showing carried current waveforms when a phase shift occurs.

As shown in FIG. 18, for example, where phases of the counter-electromotive voltage waveforms VV and VW of V-phase and W-phase are shifted −10[°] and +10[°] respectively further to the 120[°] phase difference with reference to the counter-electromotive voltage waveform VU of U-phase, the carried current waveforms IU, IV and IW stored in the waveform memories 5 are as shown in FIG. 19.

Figure 20:
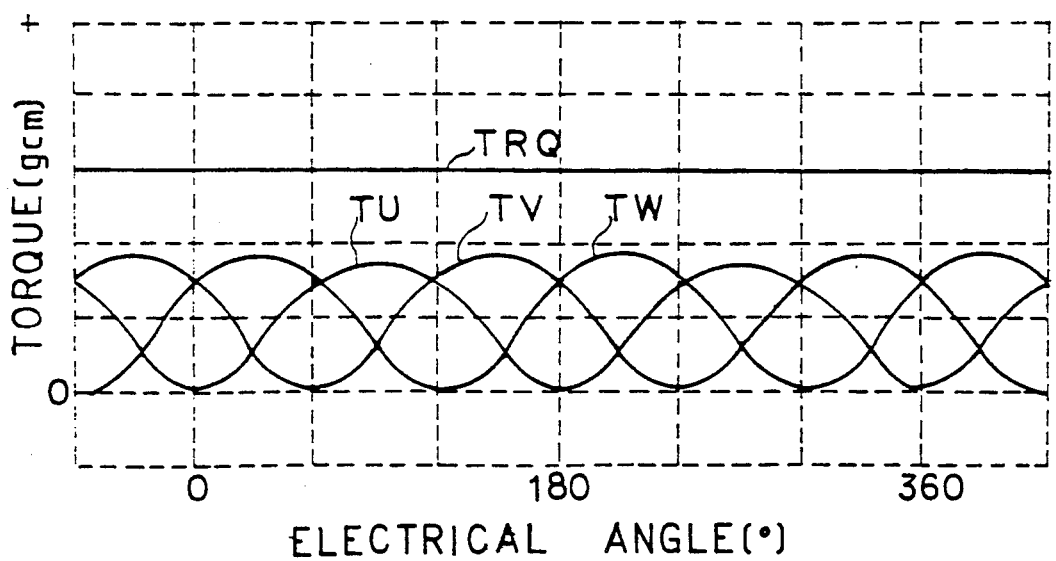
FIG. 20 is a characteristic curve showing torque waveforms when a phase shift occurs.

The torque waveforms TU, TV and TW of each phase and the resultant torque TRQ when the waveforms IU, IV and IW are carried to the coils LU, LV and LW of each phase as driving currents are unified as shown in FIG. 20. In this case, the total current at the common junction COM of the coils LU, LV and LW at an arbitrary rotor angle is also reduced to zero. Accordingly, the present invention is also applicable when a phase difference occurs in the counter-electromotive voltages.

Other Embodiment

In the aforementioned embodiment, the description has referred to the case where the invention is applied to a 3-phase brushless motor, however, the present invention is not necessarily limited thereto, and hence is applicable likewise to other type brushless motor such as 2-phase brushless motor or the like.

As described above, according to the present invention, a driving current with the torque pulsation getting small at respective brushless motors having a difference in magnetic circuit configuration is calculated according to a predetermined method, and the brushless motor is driven on the calculate driving current, therefore such brushless motor driving device as is capable of minimizing the torque pulsation of a brushless motor according to a simple method may be realized.

Further, an arrangement is such that driving current waveforms are calculated so as to reduce the sum of currents carried to the coils of each phase to zero, therefore a necessity to keep a common junction of the coils of each phase at a low impedance is avoided, thereby simplifying a circuit configuration furthermore.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A brushless motor driving device which has memory means for storing a waveform of a driving current carried to a coil of each phase of a brushless motor, specifying means for specifying a rotor angle of said brushless motor by counting a predetermined frequency signal detected from said brushless motor, and output means for outputting the waveform of said driving current corresponding to said rotor angle from said memory means according to said rotor angle specified by the specifying means, comprising:

calculating means for calculating the waveform of said driving current carried to said coil of each phase while said motor is driven externally so as to have a value obtained from multiplying an interlinked flux quantity said coil receives by a current value flowing to said coil at the value proportional to the square of a sine wave to said rotor angle;

storing control means for storing a waveform calculating result from said calculating means in said memory means; and deriving control means for deriving the stored waveform calculation result from said memory means to said output means so as to drive said brushless motor on the basis of a stored waveform of said driving current.

2. A brushless motor driving device which has memory means for storing a waveform of a driving current carried to a coil of each phase of a brushless motor, specifying means for specifying a rotor angle of said brushless motor by counting a predetermined frequency signal detected from said brushless motor, and output means for outputting the waveform of said driving current corresponding to said rotor angle from said memory means according to said rotor angle specified by the specifying means, comprising:

calculating means for calculating the waveform of said driving current carried to said coil of each phase so as to have a value obtained from multiplying an interlinked flux quantity said coil receives by a current value flowing to said coil at the value proportional to the square of a sine wave to said rotor angle;

storing control means for storing a waveform calculation result from said calculating means in said memory means; and deriving control means for deriving the stored waveform calculation result from said memory means to said output means so as to drive said brushless motor on the basis of a stored waveform of said driving current;

wherein said output means comprises:

driving current detecting means for detecting the driving currents for said respective phase coils of said brushless motor;

comparing means for comparing said detected driving currents obtained by said driving current detecting means with waveform values derived from said memory means;

first transistor circuit means for generating said driving currents for the respective phases, said transistor circuit means controlled by comparing outputs obtained from said comparing means so as to cause said driving currents to coincide with said waveform value from said memory means; and second transistor circuit means for controlling a value of a current carried to a common junction of said brushless motor.

3. A brushless motor driving device which has memory means for storing beforehand a waveform of a driving current carried to a coil of each phase of a brushless motor, specifying means for specifying a rotor angle of said brushless motor by counting a predetermined frequency signal detected from said brushless motor, and output means for outputting the waveform of said driving current corresponding to said rotor angle from said memory means according to said rotor angle specified by the specifying means, comprising:

calculating means for calculating a waveform of a current which will reduce the sum of currents carried to said coil of each phase to zero and make an output torque of said brushless motor constant, said calculated waveform of a current outputted as the waveform of said driving current.

4. The brushless motor driving device according to claim 3, wherein said output means comprises:

driving current detecting means for detecting the driving currents for said respective phase coils of said brushless motor;

comparing means for comparing said detected driving currents obtained from said driving current detecting means with waveform values derived from said memory means;

first transistor circuit means for generating the driving currents for the respective phases, said transistor circuit means to be controlled by comparing outputs obtained from said comparing means so as to cause said driving currents to coincide with said waveform value from said memory means; and condenser means connected between a common junction of said brushless motor and the earth potential.

5. A brushless motor driving method in which a memory means stores a waveform of a driving current carried to a coil of each phase of a brushless motor into a memory means, a specifying means specifies a rotor angle of said brushless motor by counting a predetermined frequency signal detected from said brushless motor, and an outputting means outputs the waveform of said driving current corresponding to said rotor angle from said memory means according to said rotor angle specified by the specifying means, comprising the steps of:

calculating the waveform of said driving means carried to said coil of each phase by calculating means while externally driving said brushless motor so as to have a value obtained from multiplying an interlinked flux quantity said coil receives by a current value flowing to said coil at the value proportional to the square of a sine wave to said rotor angle;

storing the waveform calculation result in said memory means by storing control means; and deriving the stored waveform calculation result from said memory means to said output means by deriving control means so as to drive said brushless motor on the basis of a stored waveform of said driving current.

6. A brushless motor driving method in which a memory means stores a waveform of a driving current carried to a coil of each phase of a brushless motor into a memory means, a specifying means specifies a rotor angle of said brushless motor by counting a predetermined frequency signal detected from said brushless motor, and an outputting means outputs the waveform of said driving current corresponding to said rotor angle from said memory means according to said rotor angle specified by the specifying means, comprising the steps of:

calculating the waveform of said driving means carried to said coil of each phase by calculating means so as to have a value obtained from multiplying an interlinked flux quantity said coil receives by a current value flowing to said coil at the value proportional to the square of a sine wave to said rotor angle;

storing the waveform calculation result in said memory means by storing control means; and deriving the stored waveform calculation result from said memory means to said output means by deriving control means so as to drive said brushless motor on the basis of a stored waveform of said driving current;

wherein said calculating step comprises the steps of:

driving externally said brushless motor;

deciding whether or not a pulse generation signal obtained from a pulse generator provided on the brushless motor is detected;

deciding whether or not a frequency generating signal is detected from the brushless motor;

measuring a counter-electromotive voltage generated from each coil;

storing the counter-electromotive voltages of each coil into a memory; and calculating an optimum waveform as said driving current waveform on the basis of said counter-electromotive voltages stored in said waveform memory.

7. The brushless motor driving method according to claim 6, wherein said step of calculating said optimum waveform comprises the steps of:

reading said counter-electromotive voltages from said memory;

calculating values of the optimum driving current waveforms from the counter-electromotive voltages; and loading said values obtained thus in said waveform memories as said driving current waveform.

\* \* \* \* \*